(12) United States Patent
Tzikas et al.

(10) Patent No.: US 6,518,409 B2
(45) Date of Patent: Feb. 11, 2003

(54) REACTIVE DYES, PROCESSES FOR THE PREPARATION THEREOF AND THE USE THEREOF

(75) Inventors: Athanassios Tzikas, Pratteln (CH); Rolf Deitz, deceased, late of Basel (CH), by Heidi Deitz, legal representative; Bruno Cortese, Brunstatt (FR)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 121 days.

(21) Appl. No.: 09/811,951

(22) Filed: Mar. 19, 2001

(65) Prior Publication Data

US 2001/0027582 A1 Oct. 11, 2001

(51) Int. Cl.⁷ .......................... C09B 62/51; D06P 1/384
(52) U.S. Cl. ............................. 534/638; 8/549
(58) Field of Search ............... 534/638; 8/549

(56) References Cited

U.S. PATENT DOCUMENTS

| | | | | |
|---|---|---|---|---|
| 4,754,023 A | * | 6/1988 | Tzikas et al. | 534/618 |
| 4,845,203 A | * | 7/1989 | Dietz et al. | 534/637 |
| 4,975,530 A | | 12/1990 | Tzikas et al. | 534/633 |
| 5,071,442 A | * | 12/1991 | Luttringer et al. | 8/549 |
| 5,484,458 A | | 1/1996 | Russ et al. | 8/549 |

FOREIGN PATENT DOCUMENTS

| | | |
|---|---|---|
| DE | 4231537 | 3/1993 |
| EP | 0070806 | 1/1983 |
| EP | 1041122 | 10/2000 |
| GB | 1576237 | 10/1980 |

OTHER PUBLICATIONS

Derwent Abstr. 93–096097/12 for DE 4231537 (1993).
Derwent Abstr. 12820 K/06 for EP 0070806 (1983).

* cited by examiner

*Primary Examiner*—Fiona T. Powers
(74) *Attorney, Agent, or Firm*—Kevin T. Mansfield

(57) ABSTRACT

Reactive dyes of formula

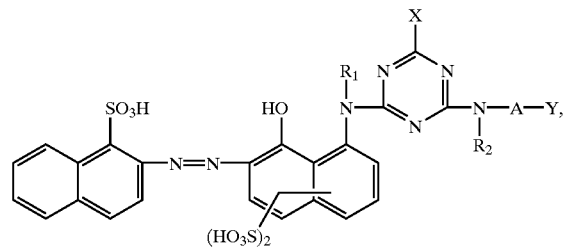

(1)

wherein
$R_1$ and $R_2$ are each independently of the other hydrogen or unsubstituted or substituted $C_1$–$C_4$alkyl,
A is $C_2$–$C_8$alkylene interrupted by oxygen,
X is halogen, and
Y is a fiber-reactive radical of formula (2)

$$—SO_2—Z \qquad (2)$$

wherein
Z is vinyl or a radical —$CH_2$—$CH_2$—U and U is a group removable under alkaline conditions, are suitable especially for dyeing cotton and yield dyeings having good allround properties.

10 Claims, No Drawings

REACTIVE DYES, PROCESSES FOR THE PREPARATION THEREOF AND THE USE THEREOF

The present invention relates to novel reactive dyes, to processes for the preparation thereof and to the use thereof in dyeing or printing textile fibre materials.

The practice of dyeing using reactive dyes has recently led to higher demands being made of the quality of the dyeings and the profitability of the dyeing process. As a result, there is still a need for novel reactive dyes having improved properties, especially in respect of their application.

Dyeing nowadays requires reactive dyes that have sufficient substantivity and at the same time have good ease of washing off of unfixed dye. They should also have a good tinctorial yield and high reactivity, the objective being to provide especially dyeings having high degrees of fixing. The known dyes do not satisfy these requirements in all properties.

The problem underlying the present invention is accordingly to find, for the dyeing and printing of fibre materials, novel improved reactive dyes that possess the qualities characterised above to a high degree. The novel dyes should especially be distinguished by high fixing yields and high fiber-dye bond stability; it should also be possible for dye that is not fixed to the fibre to be washed off easily. The dyes should also yield dyeings having good allround properties, for example light fastness and wet fastness properties.

It has been shown that the problem posed is largely solved by the novel dyes defined below.

The present invention accordingly relates to reactive dyes of formula (1)

(1)

[Structure: naphthalene with $SO_3H$ group, azo linkage (N=N) to hydroxynaphthalene bearing $(HO_3S)_2$, connected to triazine ring with X, and $N(R_1)$—triazine—$N(R_2)$—A—Y substituents]

wherein
$R_1$ and $R_2$ are each independently of the other hydrogen or unsubstituted or substituted $C_1$–$C_4$alkyl,
A is $C_2$–$C_8$alkylene interrupted by oxygen,
X is halogen, and
Y is a fibre-reactive radical of formula (2)

$$-SO_2-Z \quad (2)$$

wherein
Z is vinyl or a radical —$CH_2$—$CH_2$—U and U is a group removable under alkaline conditions.

As $C_1$–$C_4$alkyl for $R_1$ and $R_2$, each independently of the other, there come into consideration, for example, methyl, ethyl, propyl, isopropyl, butyl, sec-butyl, tert-butyl and isobutyl, preferably methyl or ethyl, and especially methyl. The alkyl radicals mentioned may be unsubstituted or substituted, for example, by hydroxy, sulfo, sulfato, cyano or by carboxyl.

As halogen for X there come into consideration, for example, fluorine, chlorine and bromine.

As a leaving group U there come into consideration, for example, —Cl, —Br, —F, —$OSO_3H$, —$SSO_3H$, —OCO—$CH_3$, —$OPO_3H_2$, —OCO—$C_6H_5$, —$OSO_2$—$C_1$–$C_4$alkyl and —$OSO_2$—N($C_1$–$C_4$alkyl)$_2$. U is preferably a group of formula —Cl, —$OSO_3H$, —$SSO_3H$, —OCO—$CH_3$, —OCO—$C_6H_5$ or —$OPO_3H_2$, especially —Cl or —$OSO_3H$, and more especially —Cl.

For A there comes into consideration, for example, a radical of formula —$(CH_2)_2$—O—$(CH_2)_2$—, —$(CH_2)_3$—O—$(CH_2)_2$— or —$(CH_2)_3$—O—$(CH_2)_3$—.

Preference is given to the reactive dyes according to the invention wherein $R_1$ and $R_2$ are each independently of the other hydrogen or $C_1$–$C_4$alkyl, especially hydrogen.

Preference is given to the reactive dyes according to the invention wherein X is fluorine or chlorine, especially chlorine.

A in the reactive dyes according to the invention is preferably a $C_2$–$C_6$alkylene radical, especially a $C_2$–$C_4$alkylene radical, interrupted by oxygen, e.g. —$(CH_2)_2$—O—$(CH_2)_2$—.

Preference is given to the reactive dyes according to the invention wherein the radical of formula —A—Y is a radical of formula (3)

$$-(CH_2)_{2-4}-O-(CH_2)_{2-4}-SO_2-Z \quad (3),$$

especially a radical of formula (3a)

$$-(CH_2)_2-O-(CH_2)_2-SO_2-Z \quad (3a),$$

wherein
Z is vinyl, βchloroethyl or βsulfatoethyl, especially vinyl or βchloroethyl.

The naphthalene coupling component on which the reactive dyes according to the invention are based corresponds, for example, to the formula (4.1)

[Structure: naphthalene with HO, $NHR_1$, $HO_3S$, $SO_3H$ substituents]

(4.2)

[Structure: naphthalene with HO, $NHR_1$, $HO_3S$, $SO_3H$ substituents]

or (4.3)

[Structure: naphthalene with HO, $NHR_1$, $SO_3H$, $SO_3H$ substituents]

preferably formula (4.1) or (4.2), and especially formula (4.1), wherein the definitions and preferred meanings given above apply for $R_1$.

Special preference is given to the reactive dye of formula (1a)

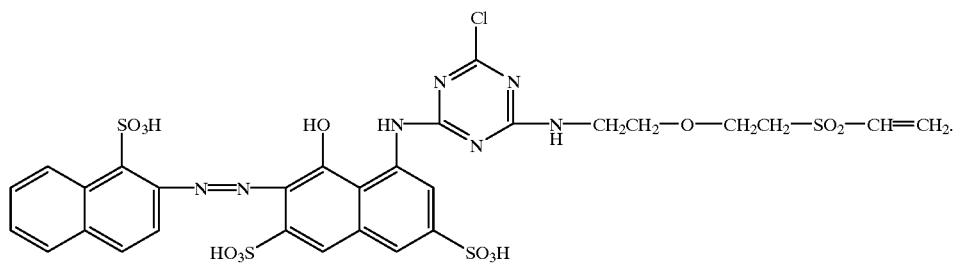

The present invention relates also to a process for the preparation of the reactive dyes according to the invention, which process comprises reacting a compound of formula (5)

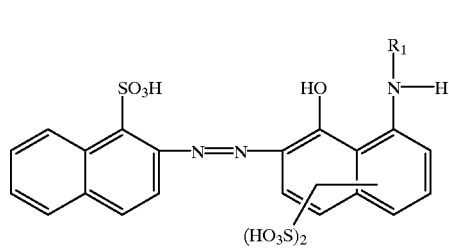

and cyanuric halide and an amine of formula (6)

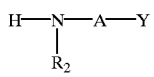

with one another in any desired order, wherein the definitions and preferred meanings given above apply for $R_1$, $R_2$, A and Y.

Because the process steps mentioned above may be carried out in different orders as well as, where appropriate, simultaneously, different process variants are possible. The reaction is generally carried out stepwise, the order of the simple reactions between the particular reaction components advantageously being determined by the prevailing conditions. For example, approximately 1 molar equivalent of an amine of formula (6) is reacted with approximately 1 molar equivalent of cyanuric halide and the product obtained is then condensed with approximately 1 molar equivalent of a compound of formula (5). In another process variant, for example, approximately 1 molar equivalent of a compound of formula (5) is reacted with approximately 1 molar equivalent of cyanuric halide and the mixture obtained is then condensed with approximately 1 molar equivalent of an amine of formula (6).

The individual condensation reactions are carried out, for example, using methods known per se, generally in aqueous solution, at a temperature of, for example, from 0 to 50° C., especially from 0 to 10° C., and at a pH of, for example, from 3 to 10, especially from 3 to 7.

As cyanuric halide there are suitable, for example, cyanuric chloride and cyanuric fluoride, especially cyanuric chloride.

The end product may optionally be subjected to a further transformation reaction. Such a transformation reaction is, for example, conversion of a reactive group, present in Y and capable of conversion into a vinyl group, into its vinyl form by treatment with dilute sodium hydroxide solution, e.g. conversion of the β-sulfatoethylsulfonyl or β-chloroethylsulfonyl group into the vinylsulfonyl radical. Such reactions are known per se.

The compounds of formulae (5) and (6) are known or can be prepared analogously to known compounds.

The compounds of formula (1) according to the invention are suitable as dyes for dyeing and printing a wide variety of materials, such as hydroxyl-group-containing or nitrogen-containing fibre materials. Examples of nitrogen-containing fibre materials include silk, leather, wool, polyamide fibres and polyurethanes. The reactive dyes according to the invention are especially suitable for dyeing and printing all types of cellulosic fibre materials. Such cellulosic fibre materials are, for example, natural cellulose fibres, such as cotton, linen and hemp, and cellulose and regenerated cellulose, preferably cotton. The reactive dyes according to the invention are also suitable for dyeing or printing cellulosic blend fabrics, for example blends of cotton and polyamide fibres or especially cotton/polyester blends.

The reactive dyes according to the invention can be applied to the fibre material and fixed to the fibre in a number of ways, especially in the form of aqueous dye solutions or dye print pastes. They are suitable for the exhaust process and also for dyeing using the pad-dyeing process, according to which the goods are impregnated with aqueous, optionally salt-containing, dye solutions and the dyes are fixed, after treatment with an alkali or in the presence of an alkali, optionally under the action of heat or as a result of storage for several hours at room temperature. After fixing, the dyeings or prints are thoroughly rinsed with cold and hot water, optionally with addition of an agent that has a dispersing action and promotes diffusion of unfixed dye.

The reactive dyes according to the invention are distinguished by high reactivity, good fixing characteristics and very good build-up characteristics. They can therefore be used in the exhaust dyeing process at low dyeing temperatures and require only short steaming times in the pad-steam process. The degrees of fixing are high and unfixed dye can be washed off readily, the difference between the degree of exhaust and the degree of fixing being remarkably small, that is to say the soaping loss is very small. The dyes according to the invention are also especially suitable for printing, especially on cotton, but also for printing nitrogen-containing fibres, for example wool or silk or blend fabrics containing wool or silk.

The dyeings and prints produced using the reactive dyes according to the invention have a high tinctorial strength and a high fibre-dye bond stability in both acidic and alkaline ranges, and they also have good light fastness and very good wet fastness properties, such as fastness to washing, to water, to seawater, to crossdyeing and to perspiration, as well as good fastness to chlorine, to pleating, to hot pressing and to rubbing.

The following Examples serve to illustrate the invention. The temperatures are given in degrees Celsius, parts are parts by weight, and the percentages relate to percent by weight, unless otherwise indicated. Parts by weight relate to parts by volume in a ratio of kilograms to liters.

EXAMPLE 1 a) 18.5 parts of cyanuric chloride are vigorously stirred at a temperature of 0° C. in 100 parts of an ice/water mixture with addition of a wetting agent and 0.16 part of disodium hydrogen phosphate. A neutral solution of 55.30 parts of a dye of formula

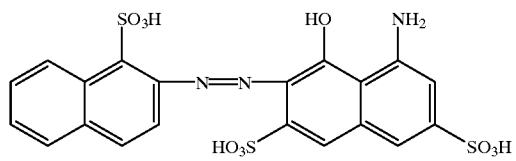

in 580 parts of water is added thereto dropwise. The temperature of the reaction mixture is maintained at from 0 to 5° C. and the pH is maintained at 7 by addition of lithium hydroxide solution, until the condensation is complete.

b) At 4° C. and pH 7, first 22.63 parts of a compound of formula

are added to the reaction mixture obtained according to a) and then, at a temperature of from 4 to 6° C., adjustment to a pH of 7.5 is carried out by addition of 20% soda solution. Condensation is carried out for a further 4 hours at from 24 to 34° C. and at pH 7.5. The pH is then adjusted to 6 using dilute hydrochloric acid and stirring is then carried out overnight at room temperature.

c) The reaction mixture obtained according to b) is adjusted to pH 11 by addition of sodium hydroxide solution and is stirred for 35 minutes at that pH and at room temperature. The pH is then adjusted to 6 using dilute hydrochloric acid; the reaction mixture obtained is clarified by filtration and concentrated by evaporation in vacuo at slightly elevated temperature. 152.9 parts of a mixture are obtained that comprises a compound that in the form of the free acid corresponds to formula (101)

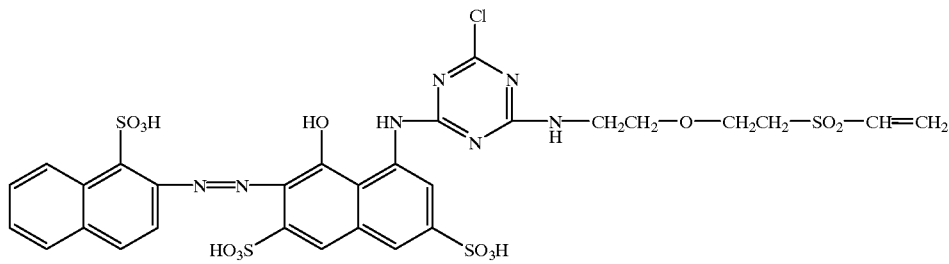

and dyes cotton a red shade with good allround properties.

Dyeing Procedure I 100 parts of cotton fabric are placed, at 80° C., in 1500 parts of a dye bath containing 45 g of sodium chloride per liter and 2 parts of the reactive dye obtained according to Example 1. After 45 minutes, 20 g of calcined soda per liter are added at 80° C. Dyeing is carried out for a further 45 minutes at that temperature. The dyed goods are then rinsed, soaped at the boil for a quarter of an hour with a non-ionic detergent, rinsed again and dried.

As an alternative to the procedure given, dyeing may also be carried out at 60° C. rather than 80° C.

Dyeing Procedure II 0.1 part of the dye according to Example 1 is dissolved in 200 parts of water, and 0.5 part of sodium sulfate, 0.1 part of a levelling aid (based on the condensation product of a higher aliphatic amine and ethylene oxide) and 0.5 part of sodium acetate are added. The pH is then adjusted to 5.5 using acetic acid (80%) The dye bath is heated at 50° C. for 10 minutes and then 10 parts of a woollen fabric are added. The bath is heated to a temperature of 100° C. over a period of about 50 minutes and dyeing is carried out for 60 minutes at that temperature. Cooling to 90° C. is then carried out and the dyed goods are then removed. The woollen fabric is washed with hot and cold water and is then spun and dried.

Printing Procedure

While stirring rapidly, 3 parts of the dye obtained according to Example 1 are sprinkled into 100 parts of a stock thickener containing 50 parts of 5% sodium alginate thickener, 27.8 parts of water, 20 parts of urea, 1 part of sodium m-nitrobenzenesulfonate and 1.2 parts of sodium hydrogen carbonate. The print paste so obtained is used to print a cotton fabric; drying is carried out and the resulting printed fabric is steamed in saturated steam at 102° C. for 2 minutes. The printed fabric is then rinsed, optionally soaped at the boil and rinsed again, and then dried.

What is claimed is:

1. A reactive dye of formula (1)

[Structure of formula (1): naphthalene-SO₃H group with N=N azo linkage to naphthalene (HO₃S)₂ substituted, bearing HO and triazine ring with X, R₁, R₂, N—A—Y substituents]

wherein
- $R_1$ and $R_2$ are each independently of the other hydrogen or unsubstituted or substituted $C_1$–$C_4$alkyl,
- A is $C_2$–$C_8$alkylene interrupted by oxygen,
- X is halogen, and
- Y is a fibre-reactive radical of formula (2)

$$—SO_2—Z \qquad (2)$$

wherein
Z is vinyl or a radical —CH₂—CH₂—U and U is a group removable under alkaline conditions.

2. A reactive dye according to claim 1, wherein $R_1$ and $R_2$ are each independently of the other hydrogen or $C_1$–$C_4$alkyl.

3. A reactive dye according to claim 1, wherein X is fluorine or chlorine.

4. A reactive dye according to claim 1, wherein U is —Cl or —OSO₃H.

5. A reactive dye according to claim 1, wherein the radical of formula —A—Y is a radical of formula (3)

$$—(CH_2)_{2-4}—O—(CH_2)_{2-4}—SO_2—Z \qquad (3)$$

wherein
Z is vinyl, β-chloroethyl or β-sulfatoethyl.

6. A reactive dye according to claim 5, wherein the radical of formula (3) is a radical of formula (3a)

$$—(CH_2)_2—O—(CH_2)_2—SO_2—Z \qquad (3a)$$

wherein
Z is as defined in claim 5.

7. A reactive dye according to claim 1 which corresponds to formula (1a)

(1a)

[Structure of formula (1a): specific dye with Cl-triazine, methyl, HN linker, naphthalene with SO₃H, HO, two SO₃H groups, and —NH—CH₂CH₂—O—CH₂CH₂—SO₂—CH=CH₂ substituent]

—NH—CH₂CH₂—O—CH₂CH₂—SO₂—CH=CH₂

8. A process for the preparation of a reactive dye according to claim 1, which process comprises reacting a compound of formula (5)

(5)

[Structure of formula (5): naphthalene-SO₃H with N=N azo to naphthalene (HO₃S)₂ bearing HO and N(R₁)H group]

and cyanuric halide and an amine of formula (6)

$$H—\underset{R_2}{\overset{}{N}}—A—Y \qquad (6)$$

with one another in any order,
$R_1$, $R_2$, A and Y being as defined in claim 1.

9. A process for dyeing or printing hydroxyl-group-containing or nitrogen-containing fibre materials, which comprises applying to said fibre materials a reactive dye according to claim 1.

10. A process according to claim 9, wherein said fibre material is cellulosic fibre material.

* * * * *

UNITED STATES PATENT AND TRADEMARK OFFICE
CERTIFICATE OF CORRECTION

PATENT NO. : 6,518,409 B2
DATED : February 11, 2003
INVENTOR(S) : Athanassios Tzikas et al.

It is certified that error appears in the above-identified patent and that said Letters Patent is hereby corrected as shown below:

<u>Title page,</u>
Item [30], should read:
-- [30]   Foreign Application Priority Data
Mar. 22, 2000          Switzerland          0549/00 --.

Signed and Sealed this

Thirteenth Day of January, 2004

JON W. DUDAS
*Acting Director of the United States Patent and Trademark Office*